UNITED STATES PATENT OFFICE.

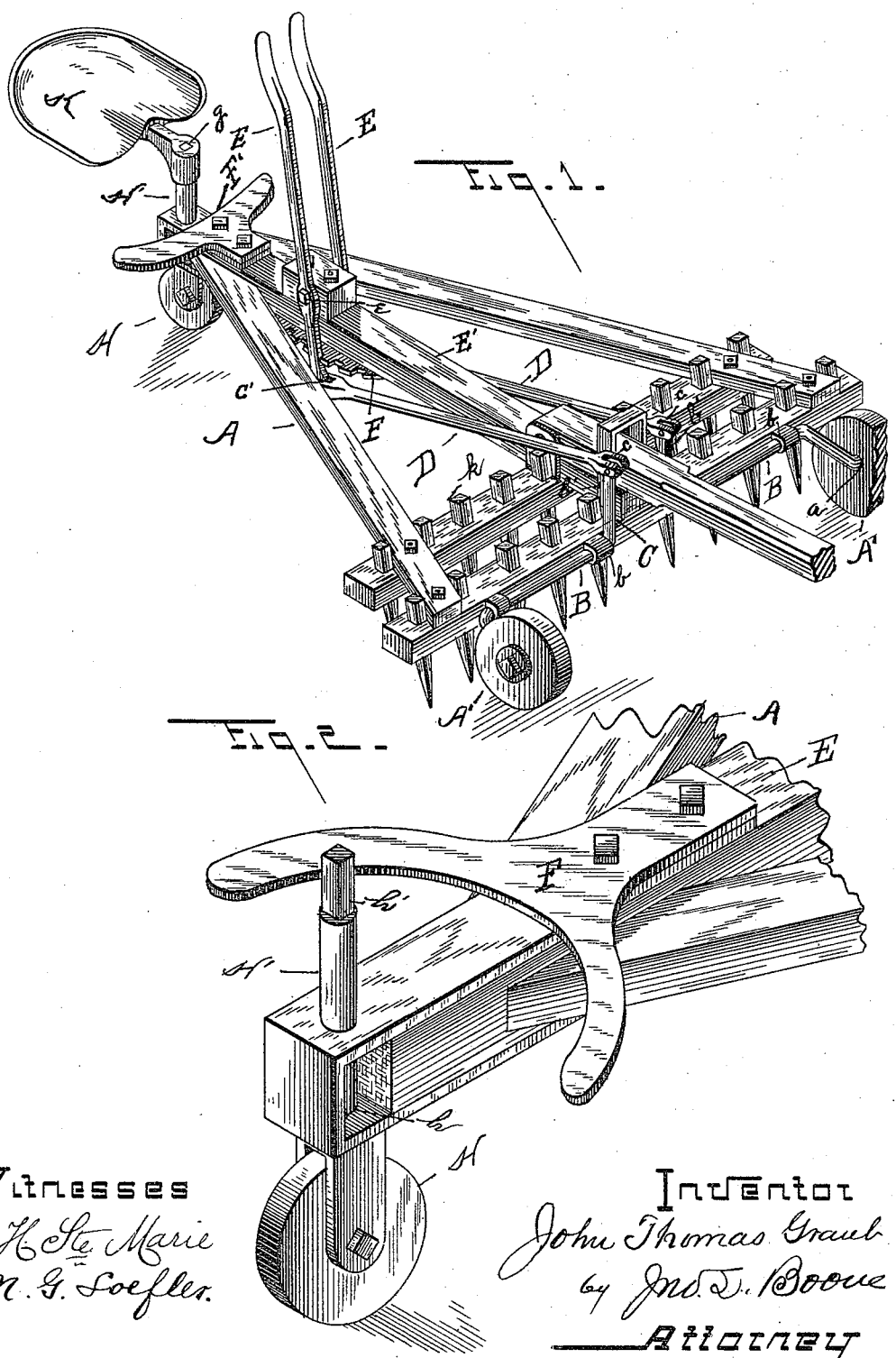

JOHN THOMAS GRANT, OF SAN JOSÉ, CALIFORNIA.

HARROW.

SPECIFICATION forming part of Letters Patent No. 441,154, dated November 25, 1890.

Application filed January 13, 1890. Serial No. 336,807. (No model.)

*To all whom it may concern:*

Be it known that I, JOHN THOMAS GRANT, a citizen of the United States, residing at San José, in the county of Santa Clara and State of California, have invented certain new and useful Improvements in Harrows; and I do hereby declare the following to be a full, clear, and exact description of said invention, such as will enable others skilled in the art to which it most nearly appertains to make, use, and practice the same.

My invention relates to certain new and useful improvements in harrows; and it consists of the parts and details of construction, as will be hereinafter more fully shown in the drawings, and described and pointed out in the specification.

The object of my invention consists in providing a harrow attachment which shall permit of the ready raising or lowering of the wheels or rollers thereof so as to allow the harrow-teeth to clear whatever obstructions— such as logs, stones, &c.—which may be in the way, for the purpose of preventing breakage thereof; and, further, in the providing of a simple and effective means for guiding the harrow in any direction by the movement of the driver's seat.

Referring to the drawings, forming a part of this application, in which similar letters of reference are used to denote corresponding parts throughout the entire specification and several views of the drawings—

Figure 1 is a perspective view of the entire device or harrow, showing my improved attachment secured thereto; and Fig. 2 is a rear perspective view showing the guiding mechanism.

The letter A is used to indicate the ordinary harrow, to the forward end of which are secured the rollers A' A', which are journaled upon the axle $a$ $a$. These axles form a portion of the crank shafts or arms B B, which arms or shafts are secured to the cross-beam C of the harrow by means of the brackets or hangers $b$ $b$, which are securely fastened thereto, and in which the crank-arms loosely work. The upwardly-extending portion $b'$ $b'$ of said arms is secured within the bifurcated end $c$ $c$ of the operating-levers D, so as to form a loose joint. The rear ends of these levers are also bifurcated, as shown at $c'$, and between the arms thereof is secured the lower end of the operating-handles E, which handles are fulcrumed at $e$ to the middle beam of the harrow, as clearly shown in the drawings.

Below the beam E' is secured the ratchet-plate F, within the teeth of which the lower end of the operating-handle is adapted to engage, so as to lock the same in any desired position, so as to regulate the lift of the harrow-frame, as hereinafter more fully described.

Secured to the rear of the operating-handles, upon the middle beam E', is the foot-guard or guide-plate F'. This plate is immovably attached thereto, and may be formed of wood or metal, as desired.

The letter H is used to indicate the guide-roller, which is secured between the bifurcated end of the caster or standard H'. This shank extends through the opening $h$, formed in the rear of the harrow, and is adapted to revolve loosely therein. The upper end $h'$ is made square, and is designed to fit within the square opening $g$ formed in the forward end of the seat K, as shown in the drawings. By the pressure of the driver's foot upon either side of the guide-plate F' the seat and guide-wheel are thrown, by the revolving of the shank H', to the opposite direction, which of necessity changes the course of the forward movement of the harrow in a manner similar to the steering of a boat.

The lifting of the harrow for the purpose of enabling the harrow-teeth $k$ to clear an obstruction is accomplished by the backward movement of either of the handles E, according to the side desired to be raised, which movement causes the operating-lever to be thrown forward, which movement of necessity throws the upwardly-extending portion $b'$ of the crank-arm downward, thereby throwing the end $b^2$ and the roller to the rear beneath the harrow-frame, which raises the frame to a height equal to the length of the downwardly-extending portion $b^2$ of the crank-arms. If so desired, both of the rollers may be thrown beneath the harrow-frame at the same time. The rollers are held in their position by means of the ratchet-plate F, which, as before stated, holds the operating-handles in any desired position.

I am aware that minor changes may be made in the construction herein shown and described without necessitating a departure from the nature and scope of my invention.

Having thus described my invention, what I claim as new, and desire to secure protection in by Letters Patent of the United States, is—

1. In a harrow, cultivator, or digger, the combination, with the frame thereof, provided with a central longitudinal beam, of a fulcrum-block secured to the upper face of said beam, a ratchet-plate secured to the under face of said beam, rock-shafts journaled in the front of the frame and carrying suitable rollers on their outer ends, operating levers or pitmen connected to the inner bent ends of the rock-shafts, and operating-handles fulcrumed to opposite sides of the fulcrum-block and having their lower ends articulating with the rear ends of the operating levers or pitmen, and adapted to be locked in their adjusted position by engagement with the ratchet-plate, substantially as set forth.

2. The combination, with a harrow, digger, cultivator, or the like, of the mechanism for raising or lowering the frame thereof, rear guide-roller, caster within which the same is journaled, the shank thereof extending through the frame, driver-seat secured thereto and adapted to revolve with the movement of the guide-roller for the purpose of changing the direction of the harrow movement, and the guide or foot plate secured to the harrow-frame, substantially as shown and described.

3. The combination, with the frame (preferably V-shaped) of a harrow, digger, or cultivator, of the rear guide-roller journaled with the bifurcated end of the caster-shank, said shank being secured within an opening formed in the rear angle of the frame, seat attached to the upper end of the shank, guide or foot plate secured to the rear of the frame, rollers journaled upon the end of the crank-shafts in front of the frame, and the operating mechanism for raising or lowering either side of the frame independent of the other, substantially as and for the purpose set forth and described.

In testimony whereof I have affixed my signature in the presence of two witnesses.

JOHN THOMAS GRANT.

In presence of—
I. S. THOMPSON,
H. D. SCRIPTURE.